US007904435B2

(12) United States Patent
Goyal et al.

(10) Patent No.: US 7,904,435 B2
(45) Date of Patent: Mar. 8, 2011

(54) SYSTEM AND METHOD FOR RESOURCE LOCK ACQUISITION AND RECLAMATION IN A NETWORK FILE SYSTEM ENVIRONMENT

(75) Inventors: Prabhakar Goyal, Mountain View, CA (US); Prashant T R Rao, Sunnyvale, CA (US); Jatin Patel, Cupertino, CA (US); Ilya Slain, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 236 days.

(21) Appl. No.: 11/372,878

(22) Filed: Mar. 10, 2006

(65) Prior Publication Data
US 2007/0214161 A1 Sep. 13, 2007

(51) Int. Cl.
G06F 7/00 (2006.01)
G06F 17/30 (2006.01)
(52) U.S. Cl. .......................... 707/704; 707/827
(58) Field of Classification Search .............. 707/8, 200, 707/687, 704, 821, 826, 827; 710/200
See application file for complete search history.

(56) References Cited

U.S. PATENT DOCUMENTS

| | | | |
|---|---|---|---|
| 5,226,163 A | 7/1993 | Karsch et al. | |
| 5,463,754 A * | 10/1995 | Beausoleil et al. | 709/213 |
| 5,574,898 A | 11/1996 | Leblang et al. | |
| 5,781,910 A | 7/1998 | Gostanian et al. | |
| 5,875,296 A | 2/1999 | Shi et al. | |
| 6,094,654 A | 7/2000 | Van Huben et al. | |
| 6,516,351 B2 | 2/2003 | Borr | |
| 6,662,196 B2 | 12/2003 | Holenstein | |
| 6,799,188 B2 | 9/2004 | Weedon | |
| 6,850,938 B1 | 2/2005 | Sadjadi | |
| 6,865,591 B1 | 3/2005 | Garg et al. | |
| 7,111,057 B1 | 9/2006 | Sherman et al. | |
| 2003/0182285 A1 * | 9/2003 | Kuwata et al. | 707/8 |
| 2004/0002974 A1 * | 1/2004 | Kravitz et al. | 707/8 |
| 2004/0220933 A1 * | 11/2004 | Walker | 707/8 |
| 2005/0022199 A1 | 1/2005 | Davis | |
| 2005/0289143 A1 * | 12/2005 | Oshri et al. | 707/8 |
| 2006/0010344 A1 | 1/2006 | Zorek et al. | |
| 2006/0053111 A1 * | 3/2006 | Bradley | 707/8 |
| 2008/0162988 A1 | 7/2008 | Zorek et al. | |

OTHER PUBLICATIONS

NFS Locks, www.buildingsecuresoftware.com/resitems/Lockfile.py, available Oct. 10, 2002, p. 1-9.*

* cited by examiner

*Primary Examiner* — James Trujillo
*Assistant Examiner* — Jeffrey Burke
(74) *Attorney, Agent, or Firm* — Brinks Hofer Gilson & Lione

(57) ABSTRACT

Systems and methods for acquiring, releasing, and reclaiming a lock of a data structure in a network file system ("NFS") are discussed. Generally, a text file is created in a management library of the data structure. The name of the text file includes an identifier of the lock, an identifier of a process attempting to acquire the lock, and an identifier of a machine on which the process attempting to acquire the lock is running. The identifier of the process attempting to acquire the lock and the identifier of the machine on which the process attempting to acquire the lock is running are is saved in the contents of the text file and a hard line is created pointing to the text file. Finally, a lock of the data structure is granted based on a number of links pointing to the text file.

24 Claims, 12 Drawing Sheets

SYSTEM AND METHOD FOR RESOURCE LOCK ACQUISITION AND RECLAMATION IN A NETWORK FILE SYSTEM ENVIRONMENT

BACKGROUND

Online advertisement service providers such as Yahoo! Search Marketing may serve over 15 billion advertisements per day. For each served advertisement, an advertisement service provider may desire to process information relating to the served advertisement such as a number of times the advertisement service provider has served the advertisement; a cost to an advertiser for serving the advertisement; an advertiser account balance after the advertisement is served; information relating to a search that caused the advertisement service provider to serve the advertisement; demographic information relating to a user that received the advertisement; or any other information relating to the served advertisement that an advertisement service provider or an advertiser may desire.

As online advertising has become more popular, advertisement service providers and advertisers desire information relating to served advertisements as soon as possible. However, currently, it may take advertisement service providers a number of hours after an advertisement is served to process all the information related to the served advertisement due to the large volume of data associated with all advertisements that an advertisement service provider services in one day, the geographic distribution of data associated with an advertisement, and the complexity of processing performed with respect to a single served advertisement. Thus, a system is desirable that can reduce the amount of time it takes an advertisement service provider to process information related to a served advertisement from a number of hours to a matter of minutes.

DETAILED DESCRIPTION OF THE DRAWINGS

The current disclosure is directed to a batch processing system that reduces the amount of time required to process a large volume of data. Generally, the disclosed batch processing system increases efficiency by distributing processing over a number of machines and providing fail-safe mechanisms that allow machines to self-recover from errors. Distributing processing prevents any point of failure within the system from stopping processing of the entire batch processing system and reduces processing time through parallel processing. Further, fail-safe mechanisms that self-recover reduce processing time by alleviating the need for human inspection each time an error occurs during processing.

Figure 1:
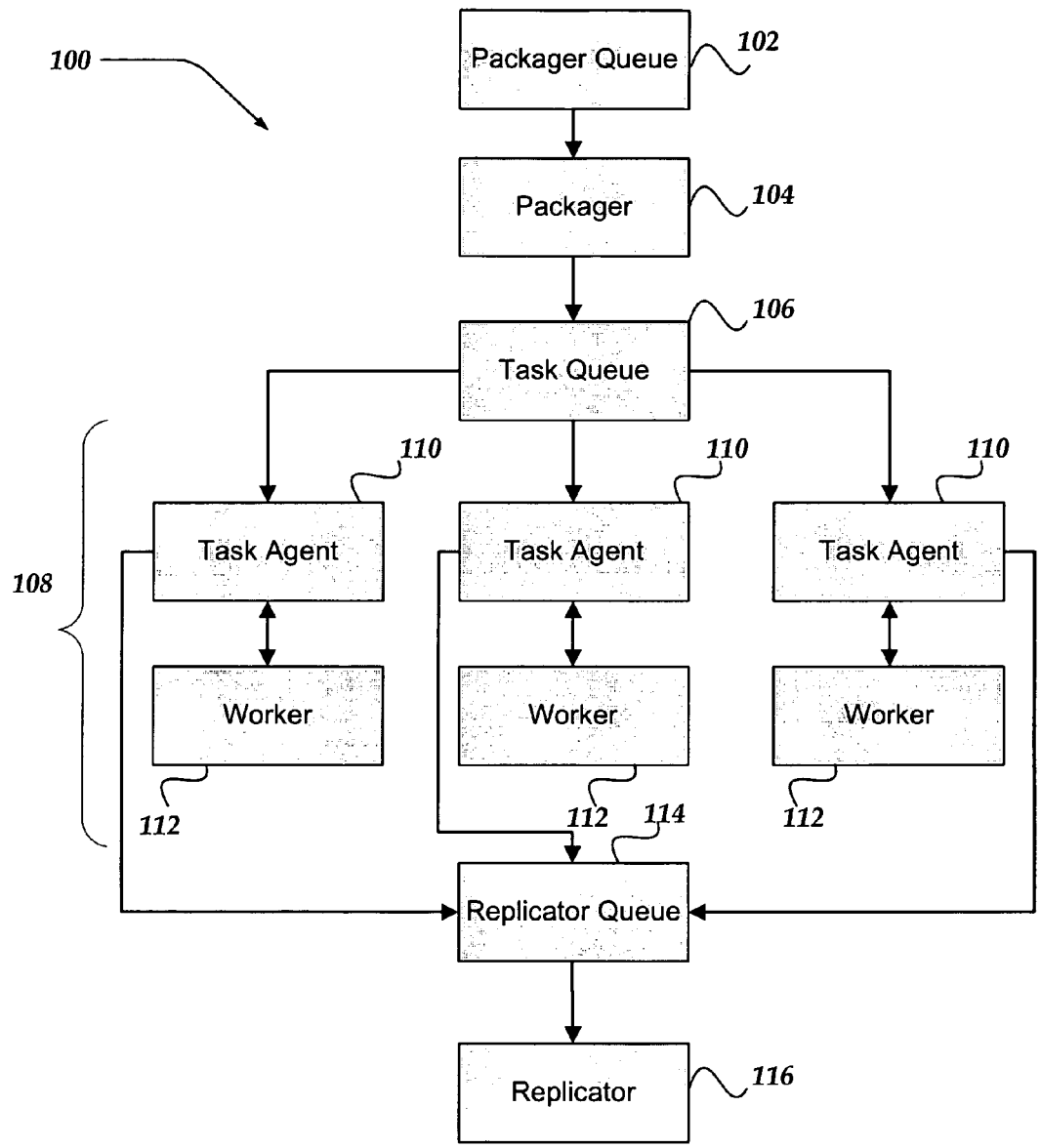
FIG. 1 is a block diagram of one embodiment of a pipeline stage in a batch processing system.

In the context of online advertising, an advertisement service provider may use the disclosed batch processing system to process information associated with a served advertisement. Typically, the batch processing system comprises at least one pipeline stage. FIG. 1 is a block diagram of one embodiment of an exemplary pipeline stage. A pipeline stage 100 generally comprises one or more data structures including a packager queue 102, a packager 104, a task queue 106, a plurality 108 of task agent 110 and worker 112 pairings, and a replicator queue 114. All of the data structures of the pipeline stage 100 may be located on a single server of the batch processing system, or be spread out over two or more servers of the batch processing system. In one embodiment, the data structures are spread out among several collocations of servers that are geographically distributed throughout the world.

Generally, a pipeline stage 100 processes a unit of work that enters the pipeline stage 100 at the packager queue 102 and proceeds through each component of the pipeline stage 100 until the processed unit of work is received at the replicator queue 114. A unit of work generally comprises a task package that defines the unit of work. The task package comprises information such as a type of work to be processed, a format of one or more records comprising the unit of work, a location of one or more records comprising the unit of work, a priority of the unit of work, an indicator of a pipeline stage that created the task package, a unit of work identifier, an identification of whether any data in the unit of work is compressed, and a count of a number of times a pipeline stage has attempted to process the unit of work.

The packager queue 102 receives the unit of work and holds the unit of work until a threshold or condition is met indicating the unit of work is ready to be processed. In one embodiment, the threshold or condition may be a number of units of work stored in the packager queue 102, a predetermined period of time since the packager queue 102 received a unit of work, a determination that the packager queue 102 has received units of work from all the necessary data to process a unit of work, or any other threshold or condition desired by an advertisement service provider.

After the threshold or condition is met, one or more units of work are released from the packager queue 102 and sent to the packager 104. In one embodiment, it is the packager 104 that monitors the packager queue 102 to determine whether the threshold or condition is met, and then instructs the packager queue 102 to send one or more units of work to the packager 104. The packager 104 receives the one or more units of work from the packager queue 102 and typically combines task packages from different units of work into larger task packages to increase efficiency. The packager 104 may combine task packages based on criteria such as units of work from multiple web servers belonging to the same time period, search and click data relating to the same time period, units of work for a given day to do close-of-books, or any other criteria that may increase efficiency in processing large volumes of units of work. After creating the new task packages, the packager 104 sends the new task packages to the task queue 106.

The task queue 106 receives task packages from the packager 104 and holds the task packages until a task agent 110 acquires one or more task packages and assigns the one or more task packages to a worker 112 for processing. In one embodiment, the task agents 110 implement greedy algorithms to acquire as many task packages from the task queue 106 that the task agent 110 can process. Further, the task agents 110 may acquire task packages based on a priority level of the task package. After acquiring a task package, the task agent 110 examines the task package to determine the operations that must be performed by a worker 112. The task agent 110 then spawns one or more workers 112 and passes at least a portion of the information stored in the task package to the worker with instructions to perform specific types of operations. For example, a task agent 110 may send command line arguments to perform an aggregation operation comprising a list of input data files and types of aggregation to be performed such as sum the impressions for each type of advertisement the advertisement service provider serves. Typically there will only be one worker 112 associated with a task agent 110. However in other embodiments, it may be possible to have more than one worker 112 associated with a task agent 110. It will be appreciated that at any moment in time, there may be multiple task agent/worker pairings 112 processing different units of work acquired from the task queue 106 to implement parallel processing of units of work within the pipeline stage 100.

The worker 112 accepts the instructions and at least a portion of the information in the task package from their associated task agent 110 and performs one or more operations as directed by the task agent 110 to process at least a portion of the information stored in the task package. For example, a worker may aggregate one or more values associated with a parameter relating to a served advertisement, calculate a maximum or minimum value of a parameter relating to a served advertisement, calculate specified parameters relating to a served advertisement based on other parameters relating to a served advertisement, back up data files relating to served advertisement, or any other action necessary for an advertisement service provider to process information relating to a served advertisement. Typically, during processing of the at least a portion of the task package, the worker 112 sends a heartbeat signal to its associated task agent 110. A heartbeat signal is a signal which indicates to a task agent 110 that the worker 112 is currently performing the operations as instructed by the task agent 110 and has not encountered an error such as a worker process failure. In one embodiment, the task agent 110 may forward the heartbeat to other portions of the pipeline stage 100 such as the task queue 106 to notify the task queue 106 that a worker 112 is processing the de-queued task package.

After processing the portion of the task package, the worker 112 reports back to the task agent 110 associated with the worker 112 that processing of the portion of the task package has been completed. Upon successful completion of the de-queued task package, the task agent 110 creates an output task package and sends the output task package to the replicator queue 114. The output task package typically comprises the result of the processed task package. In one embodiment, the output task package may comprise any information in an input task package, a list of output files created during processing of the input task package, and an identifier indicating a type of information comprising each output file created during processing of the input task package.

After receiving the results of the processed units of work, the replicator queue 114 holds the output task packages until the output task packages are requested by devices such as a replicator 116. Generally, the replicator 116 joins multiple pipeline stages and may send the output task packages resulting form processed units of work to subsequent pipelines stages for processing.

Figure 2:
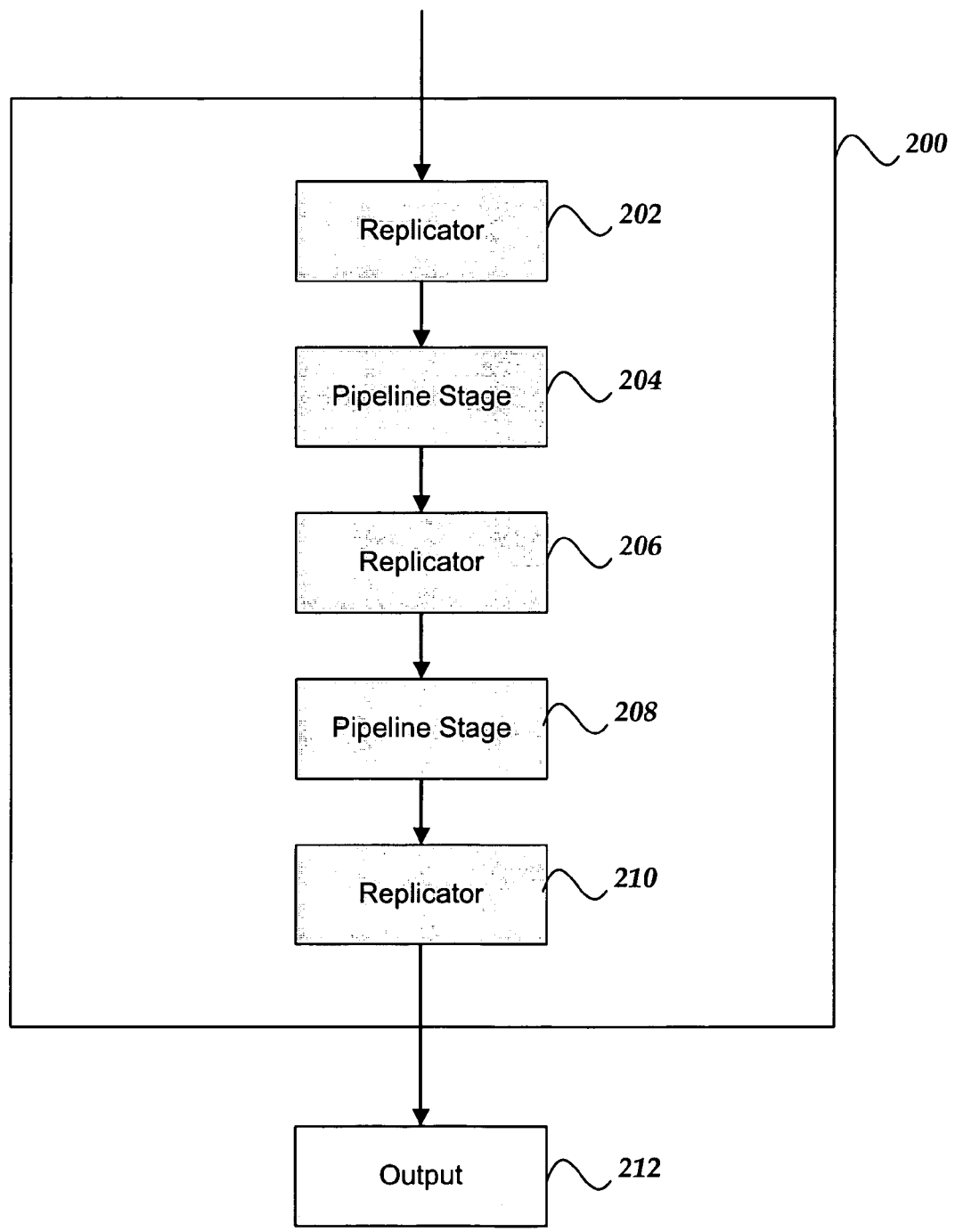
FIG. 2 is a block diagram of one embodiment of a batch processing system implementing a plurality of pipeline stages as shown in FIG. 1.

FIG. 2 is a block diagram of one embodiment of a batch processing system implementing a plurality of pipeline stages as shown in FIG. 1. Generally, a unit of work enters the pipeline 200 and is received by a first replicator 202. The first replicator 202 feeds the unit of work to a first pipeline stage 204, which processes the unit of work as described above with respect to FIG. 1. After processing the unit of work, the first pipeline stage passes the processed unit of work to a second replicator 206. The second replicator 206 feeds the unit of work to a second pipeline stage 208, which processes the unit of work as described above with respect to FIG. 1. After processing, the second pipeline stage 208 passes the processed unit of work to a third replicator 210, which outputs a result 212. It will be appreciated that while FIG. 2 illustrates a pipeline 200 with two pipeline stages 204, 208, the pipeline 200 may comprise any number of pipeline stages necessary to complete batch processing. Additionally, the pipeline 200 may comprise multiple pipeline stages which may receive units of work from a single replicator.

Figure 3:
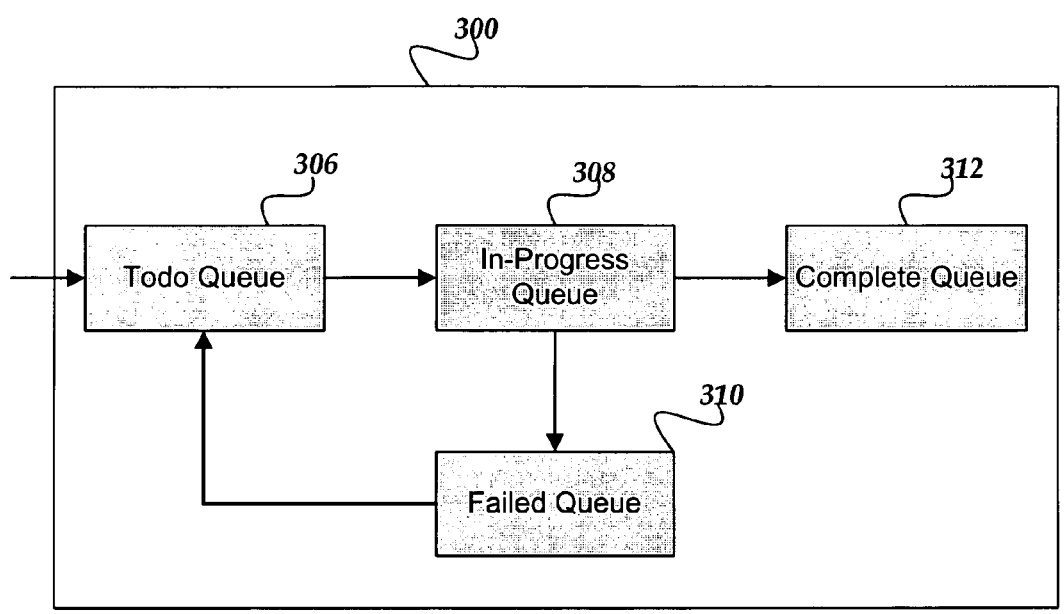
FIG. 3 is a block diagram of one embodiment of a task queue of the pipeline stage of FIG. 1.

FIG. 3 is a block diagram of one embodiment of a task queue of the pipeline stage of FIG. 1. As described above, the task queue 300 accepts one or more task packages from the packager and holds the one or more task packages until acquired by the plurality of task agents. In one embodiment, to increase efficiency of the batch processing system, the task queue 300 comprises a number of data structures corresponding to various states of a task package during processing. The data structures within the task queue assist in providing the batch processing system with self-recovery in case of an error and permit distributed processing of task packages such that no single point of failure can cause a shutdown of the entire batch processing system. Generally, the task queue 300 comprises a todo queue 306, an in-progress queue 308, a failed queue 310, and a complete queue 312 corresponding to states of a task package during processing. The todo queue 306 holds one or more task packages that need to be processed, the in-progress queue 308 holds one or more task packages that are currently being processed, the failed queue 310 holds one or more task packages that previously could not be processed after a number of attempts, and the complete queue 312 holds one or more task packages that have been successfully processed.

Figure 4:
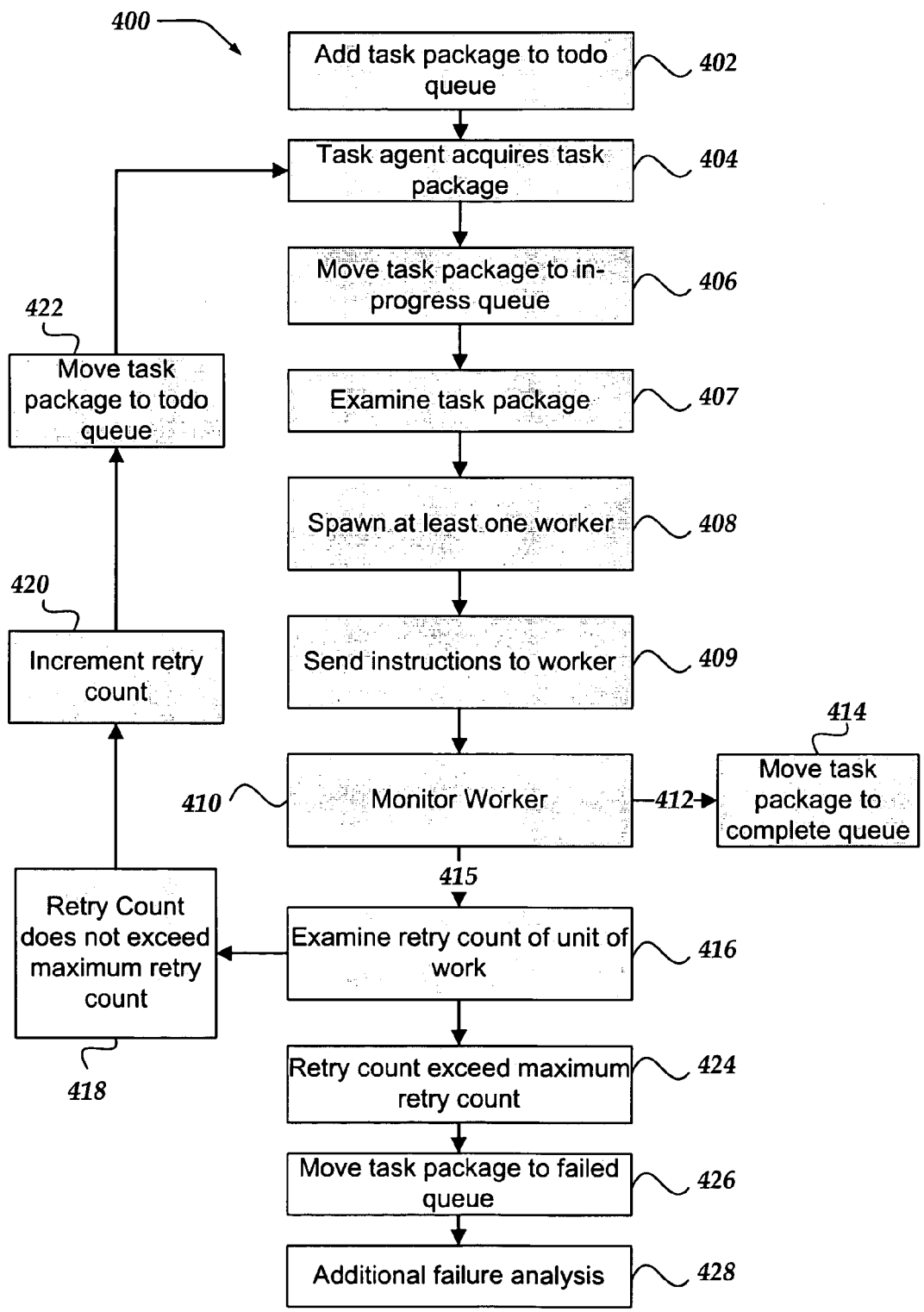
FIG. 4 is a flowchart of one embodiment of a method for a task package transitioning through a todo queue, in-progress queue, failed queue and complete queue of the task queue of FIG. 3.

Task packages typically pass between the todo queue 306, in-progress queue 308, failed queue 310 and complete queue 312 as shown in FIG. 4. FIG. 4 is a flowchart of one embodiment of a method for a task package transitioning through the todo queue 306, in-progress queue 308, failed queue 310 and complete queue 312 of the task queue. Generally, the method 400 begins with a task package being added to the todo queue of the task queue, block 402. A task agent acquires the task package from the task queue, block 404, while at substantially the same time the state of the task package in the task queue passes from the todo queue to the in-progress queue, block 406. It will be appreciated that when a task agent acquires a task package from the task queue, the task package does not physically leave the task queue. Therefore, it is possible for a task package to be in a data structure of the task queue such as the todo queue, in-progress queue, failed queue, or complete queue while the same task package is acquired by a task agent and/or processed by a worker.

After acquiring the task package at block 404, the task agent examines the task package at block 407 to determine what operations must be performed to process the task package and spawns at least one worker, block 408. The task agent sends at least a portion of the information stored in a task package to the worker for processing with instructions for what operations the worker should perform to process the at least a portion of the task package, block 409. The task agent or task queue then monitors the worker during processing, block 410. In one embodiment, the task agent or task queue monitors the worker using a heartbeat signal. The worker periodically sends a heartbeat signal to the task agent during processing, which the task agent may forward to other data structures such as the task queue. If the heartbeat signal stops before the worker has finished processing the portion of the task package, the task agent and/or the task queue will detect an error during processing of the portion of the task package.

If the worker successfully processes the task package 412, the state of the task package in the task queue passes from the in-progress queue to the complete queue at block 414. However, if the worker fails to process the unit of work 415, the task queue examines the number of times a task agent/worker pairing has attempted to process the unit of work at block 416. Typically, each task package comprises a retry count and a maximum retry count. The retry count is the number of times a task agent/worker pairing has attempted to process the task package and the maximum retry count is the maximum number of times the batch processing system should permit a task agent/worker pairing to attempt to process the task package. Examples of failures that could occur while processing a task package include a corrupt or incomplete data record in the unit of work; a worker that has taken longer than a predetermined time period to finish processing the unit of work; a worker that unexpectedly terminates before it has finished processing the unit of work; or a task agent/worker pairing becoming inaccessible to the task queue.

If the task queue examines the number of times a task agent/worker pairing has attempted to process the task package at block 416 and determines that the retry count of the task package does not exceed the maximum retry count, block 418, the task queue increments the retry count of the task package at block 420 and the state of the task package within the task queue passes from the in-progress queue to the todo queue at block 422 where the task package is reprocessed as described above.

If the task queue examines the number of times a task agent/worker pairing has attempted to process the task package at block 416 and determines that the retry count exceeds the maximum retry count, block 424, the state of the task package within the task queue passes from the in-progress queue to the failed queue at block 426 where additional failure analysis is performed.

Figure 5:
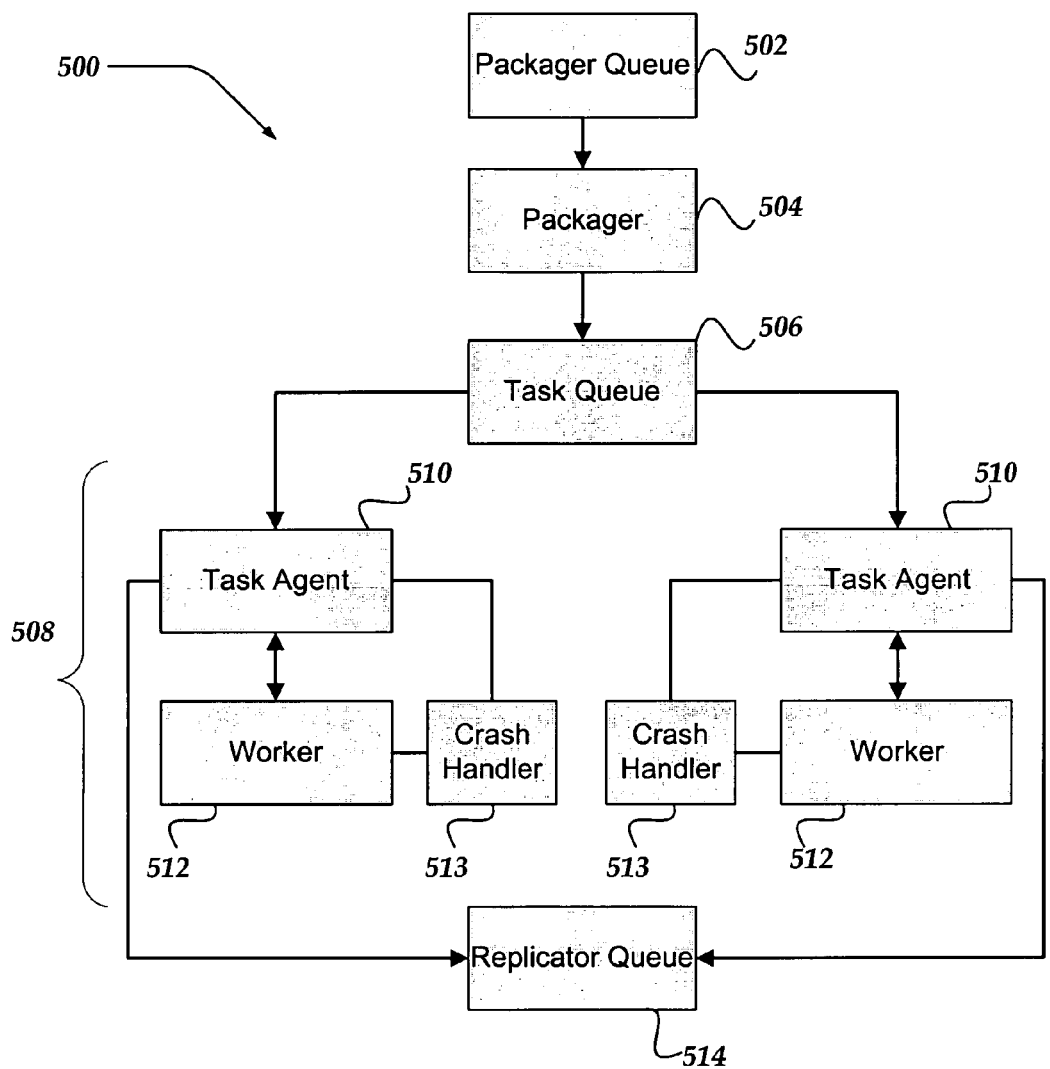
FIG. 5 is a block diagram of one embodiment of a pipeline stage operative to perform automated recovery of a task package when a worker process failure occurs.

In one embodiment, the additional failure analysis may comprise the task queue examining the task packages held in the failed queue to determine a different way for the task agent/worker pairing to process the unit of work to avoid another failure at block 428. For example, the task queue may modify the task package to instruct subsequent task agent/worker pairings attempting to process the task package to skip a set of bad data that has previously caused failure during processing. In another example, the task queue may determine that data in a related task package may need to be re-processed to allow the current task package to be processed properly. In this case, the task queue instructs a related task package to be removed form the complete queue and moved to the todo queue. Thus, implementing the multiple status queues within the task queue provides the batch processing system with self-recovery in case of an error and permits distributed processing of task packages such that no single point of failure can cause a shutdown of the entire batch processing system To further increase efficiency of the above-described batch processing system, the batch processing system may also be operative to automatically recover from errors such as a worker process failure. FIG. 5 is a block diagram of one embodiment of an exemplary pipeline stage operative to perform automated recovery of a task package when a worker process failure occurs due to partially malformatted or unsupported data. Generally, data is malformatted or unsupported when an entity such as a web server producing the data experiences a hardware or software error, an entity processing or storing the data experiences a hardware of software error, or there has been a misconfiguration or partial upgrade of software along a portion of the processing pipeline.

In one embodiment, a pipeline stage 500 operative for automated recovery of a task package comprises a packager queue 502, a packager 504, a task queue 506, a plurality 508 of task agent 510, worker 512, and crash handler 513 groupings, and a replicator queue 514. Generally, a task package is processed in the pipeline stage 500 of a batch processing system as described above with respect to FIGS. 1-4. However, as a worker 512 processes a task package, a crash handler 513 in communication with the worker 512 is operable to receive commands instructing the crash handler 513 to store a current input location of the worker 513. In one embodiment, the crash handler 513 receives the commands from a task agent 510 or a task queue 506, which instructs the crash handler to store a current input location of the worker 513 in response to detecting a worker process failure.

In one embodiment, the crash handler 513 stores the current input location of the worker 513 in the task package so that if the task package is re-processed as described above, on subsequent processing of the task package, a worker 512 may skip the record that caused the worker process failure as indicated by the crash handler 513. As the task package is re-processed, the crash handlers 513 continue to store the current input locations of worker process failures until the task package is fully processed or the number of records removed from a task package exceeds a predetermined threshold. If the number of records removed from a task package exceeds the predetermined threshold, the task queue removes the task package from processing for additional analysis such as manual inspection. The predetermined threshold may be a number of records removed from the task package, a percentage of records removed from the task package of the total number of records comprising that task package that have been removed, or any other criteria relating to a number of records removed as set within the batch processing system.

Figure 6:
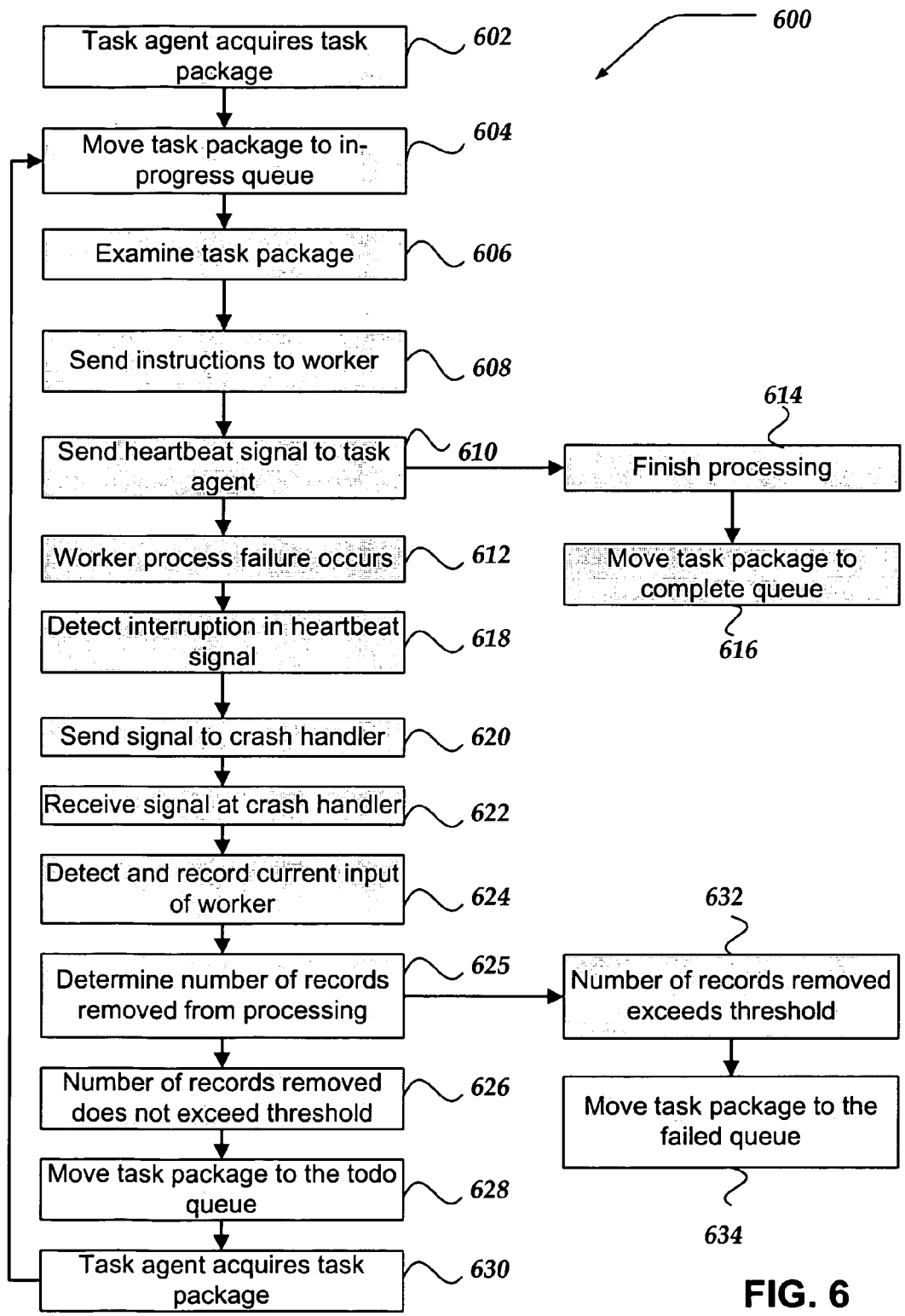
FIG. 6 is a flowchart of one embodiment of a method for automated recovery of processing of a task package when a worker process failure occurs.

FIG. 6 is a flow chart of one embodiment of a method for automated recovery of processing of a task package when a worker process failure occurs due to a partially malformatted or unsupported data. The method 600 begins with a task agent acquiring a task package from a task queue at block 602 and the status of the task package within the task queue moving from a todo queue to an in-progress queue at block 604. The task agent determines what operations need to be performed to process the task package at block 606 and passes at least a portion of the information stored the task package, along with instructions for processing the at least a portion of the task package, to a worker for processing at block 608. During processing, the worker sends a heartbeat signal to the task agent at block 610 to indicate to the task agent that the work is still processing the at least a portion of the work unit. The worker may send the heartbeat signal every 20 seconds, or any other period of time defined within the batch processing system.

The worker continues to send a heartbeat signal at block 610 until a worker process failure occurs at block 612 or the worker finishes processing the task package at block 614. If the worker finishes processing the task package at block 614, the status of the task package within the task queue moves from the in-progress queue to the complete queue at block 616.

If a worker process failure occurs at block 612, the task agent will detect that the worker has stopped sending a heartbeat signal at block 618. In response, a signal is sent to the crash handler at block 620 to record the current input of the worker. In response to receiving the signal at block 622, the crash handler detects and records the current input of the worker in the task package at block 624 so that the record causing the worker process failure may be skipped during any re-processing of the task package.

The task queue examines the task package to determine the number of records that have been removed for processing from task package at block 625. If the number of records that have been removed from processing for the task package does not exceed a predetermined threshold, block 626, the status of the task package within the task queue moves from the in-progress queue to the todo queue at block 628 assuming the retry count associated with the task package does not exceed the maximum retry count as described above with respect to FIG. 4. A task agent/worker pairing later acquires the task package from the task queue at block 630 and the above-described process is repeated.

However, if the number of records that have been removed from processing for the task package exceeds the predetermined threshold at block 632, the task package is all together removed from processing by changing the status of the task package within the task package from the in-progress queue to the failed queue at block 634.

It will be appreciated that as multiple task packages are processed at one time, multiple processes such as multiple task agent/worker pairing may be accessing data structures such as the task queue at one time. In one embodiment, to guarantee consistency between the multiple processes accessing the same data structure, a locking mechanism is implemented. Generally, the locking mechanism should be operative to operate on both a local file system and over a network file system ("NFS"). Further, the locking mechanism should be operative to reclaim a stale lock to ensure that a data structure is not locked permanently if a process fails while accessing the data structure.

Figure 7:
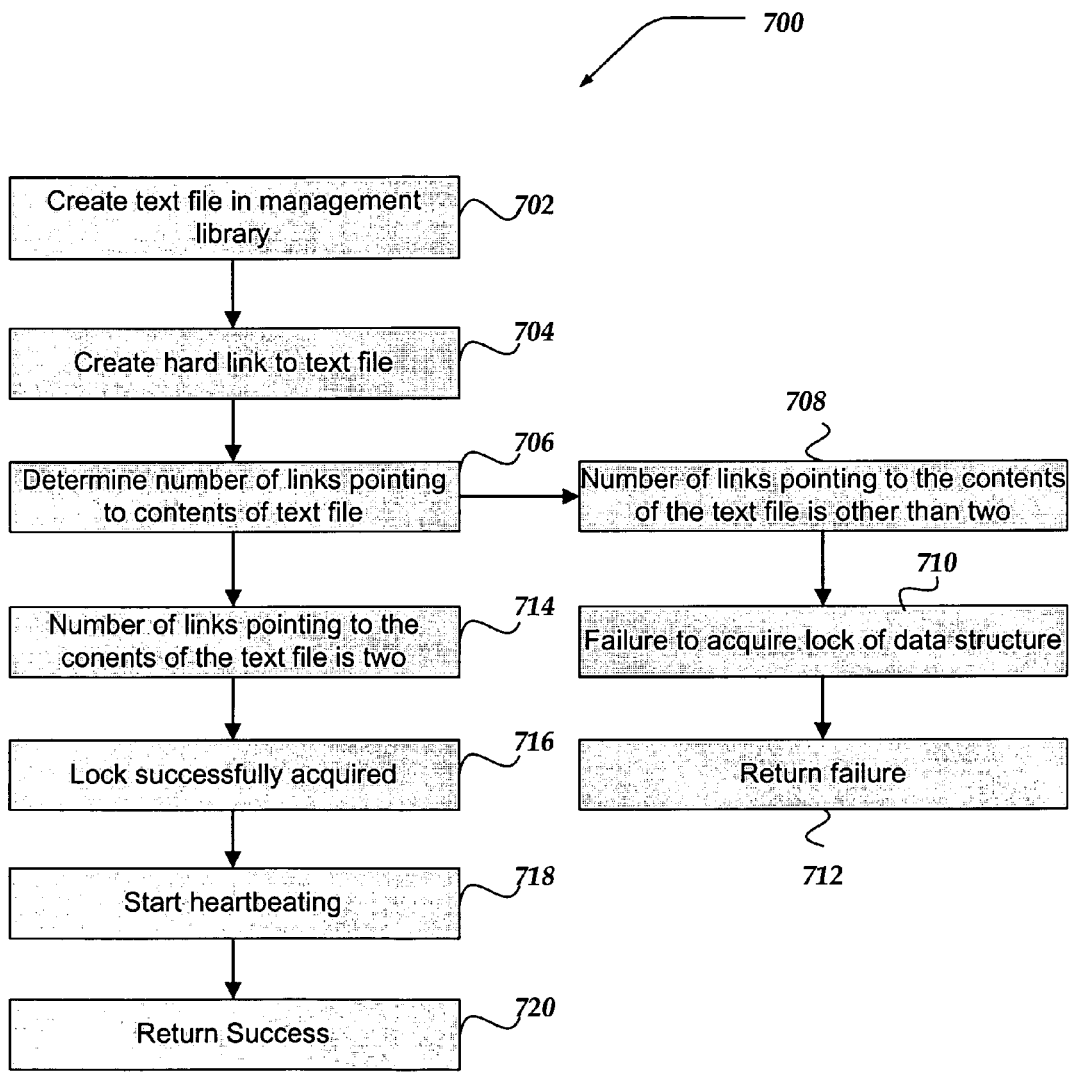
FIG. 7 is a flowchart of one embodiment of a method for acquiring a lock of a data structure in a network file system ("NFS") environment.

FIG. 7 is a flow chart of one embodiment of a method for acquiring a lock of a data structure in a network file system. Generally, a text file is created in a management library of a data structure. A management library of a data structure is a library of subprograms responsible for the creation, modification, and deletion of the data structure. One example of such a management library is a queue library. The name of a text file comprises a lockname, a hostname, and a process identifier ("id"), and the contents of the text file comprise the hostname and the process id. The lockname is a name for the lock, the hostname is an identifier of the machine on which a process attempting to obtain the lock is located, and the process id is an identifier of the process attempting to obtain the lock. In one embodiment, the text file has a name <lockname>_<hostname>_<process id>.file, but any naming convention could be used.

After creating the text file in the management library of the data structure, a pointer, known as a hard link, is created that points to the contents of the text file. Generally, a hard link is a special data structure in a file system which holds reference to itself as well as one and more other files. In one embodiment, the hard link has a name <lockname>.lock, but any naming convention could be used. After creating the text file and the hard link, a number of links pointing to the contents of the text file in the management library of the data structure is examined. If the number of links pointing to the data of the text file is two, corresponding to the originally created text file and the hard link, the process has successfully obtained the lock. However, if the number of hard links pointing to the data of the text file is any number other than two, the process has failed to obtain the lock, typically due to an error in the batch processing system.

The method 700 begins with a process creating a text file in a management library of a data structure at block 702. In one example, a process such as a task agent may create the text file in the management library of a task queue. As explained above, the name of the text file comprises a name of the data structure to be locked, a hostname indicating the location of the task agent attempting to obtain the lock, and a process id identifying the task agent attempting to obtain the lock, and the contents of the text file comprise the hostname and the process id.

The process creates a hard link that points to the contents of the text file at block 704 and determines if the number of links pointing to the contents of the text file is other than two at block 706. If no links are present pointing to the contents of the text file, or the number of links pointing to the contents of the text file is other than two, block 708, the process has not successfully acquired a lock 710 and a failure is returned at block 712. However, if the number of links pointing to the contents of the text file is equal to two, block 714, a lock is acquired at block 716, a heartbeat signal begins indicating to the batch processing system that a lock was obtained at block 718, and a value is returned indicating the lock acquisition is a success at block 720.

Figure 8:
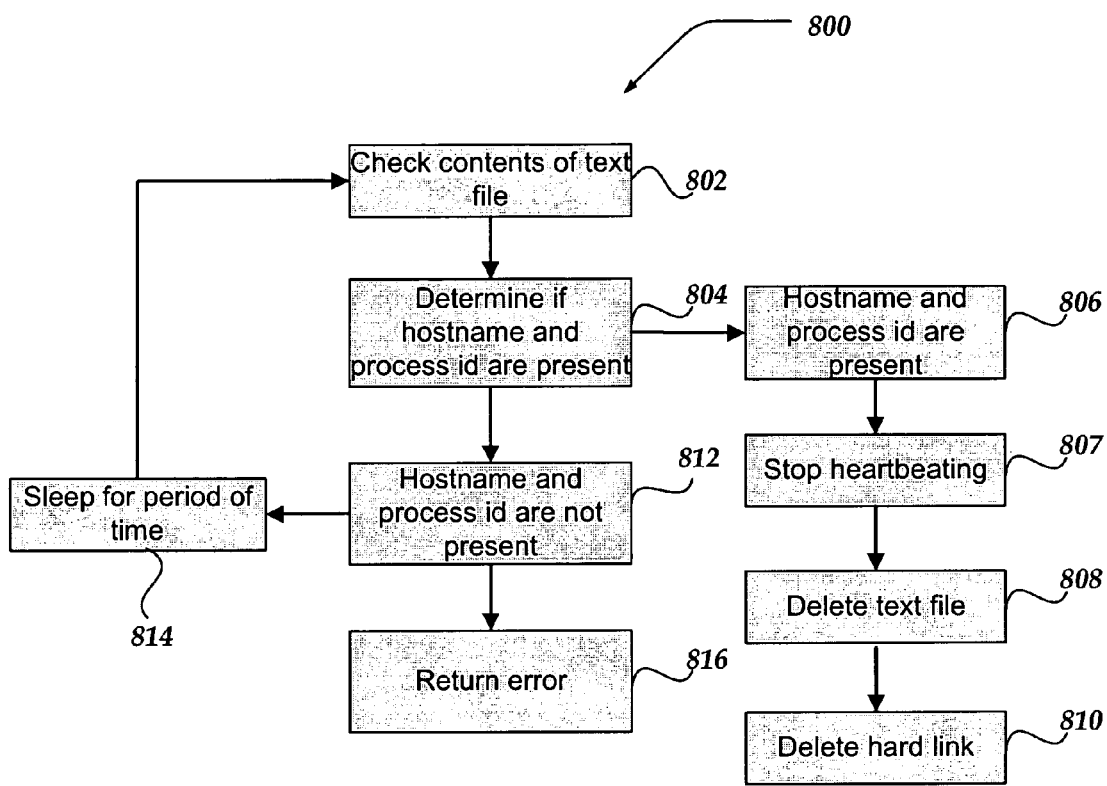
FIG. 8 is a flowchart of one embodiment of a method for releasing a lock acquired according to the method of FIG. 7.

Once a data structure is locked, no other process can access the data structure until the process originally acquiring the lock releases the lock or another process reclaims a lock after the lock becomes stale. FIG. 8 is a flow chart of one embodiment of a method for releasing a lock acquired according to the method of FIG. 7. The method 800 begins with a process checking the contents of the text file created in the management library of the data structure when the lock was created at block 802 to determine if the contents of the text file comprise the hostname for the machine on which the process attempting to release the lock is running and the process id for the process attempting to release the lock, block 804. If the process determines that the proper hostname and the process id are present in the contents of the text file, block 806, the heartbeat signal regarding the lock ceases at block 807, the lock is released by removing the text file from the management library of the data structure at block 808, and the hard link is removed from the management library of the data structure at block 810.

However, if the process determines that the hostname and the process id are not present in the contents of the text file, block 812, the process sleeps for a predetermined period of time at block 814, and checks the contents of the text file again at block 802 to determine if the contents of the text file comprise the hostname for the machine on which the process attempting to release the lock is running and the process id for the process attempting to release the lock, block 804. In one embodiment, the process may sleep at block 814 for approximately three times the rate of the heartbeat signal of the locked data structure. If the process determines that the hostname and process id are present in the contents of the text file at block 806, the lock is released by removing the text file at block 808 and removing the hard link at block 810 from the management library of the data structure. In one embodiment, if the process determines that the hostname and the process id are not present in the contents of the file at block 812, an error is returned indicating that the lock could not be released, block 816. In another embodiment, if the process determines that the hostname and process id are not present in the contents of the file at block 812, the process may again sleep for a predetermined period of time at block 814, and check the contents of the text file again at block 802 to determine if the contents of the text file comprise the hostname for the machine on which the process attempting to release the lock is running and the process id for the process attempting to release the lock, block 804.

Figure 9A:
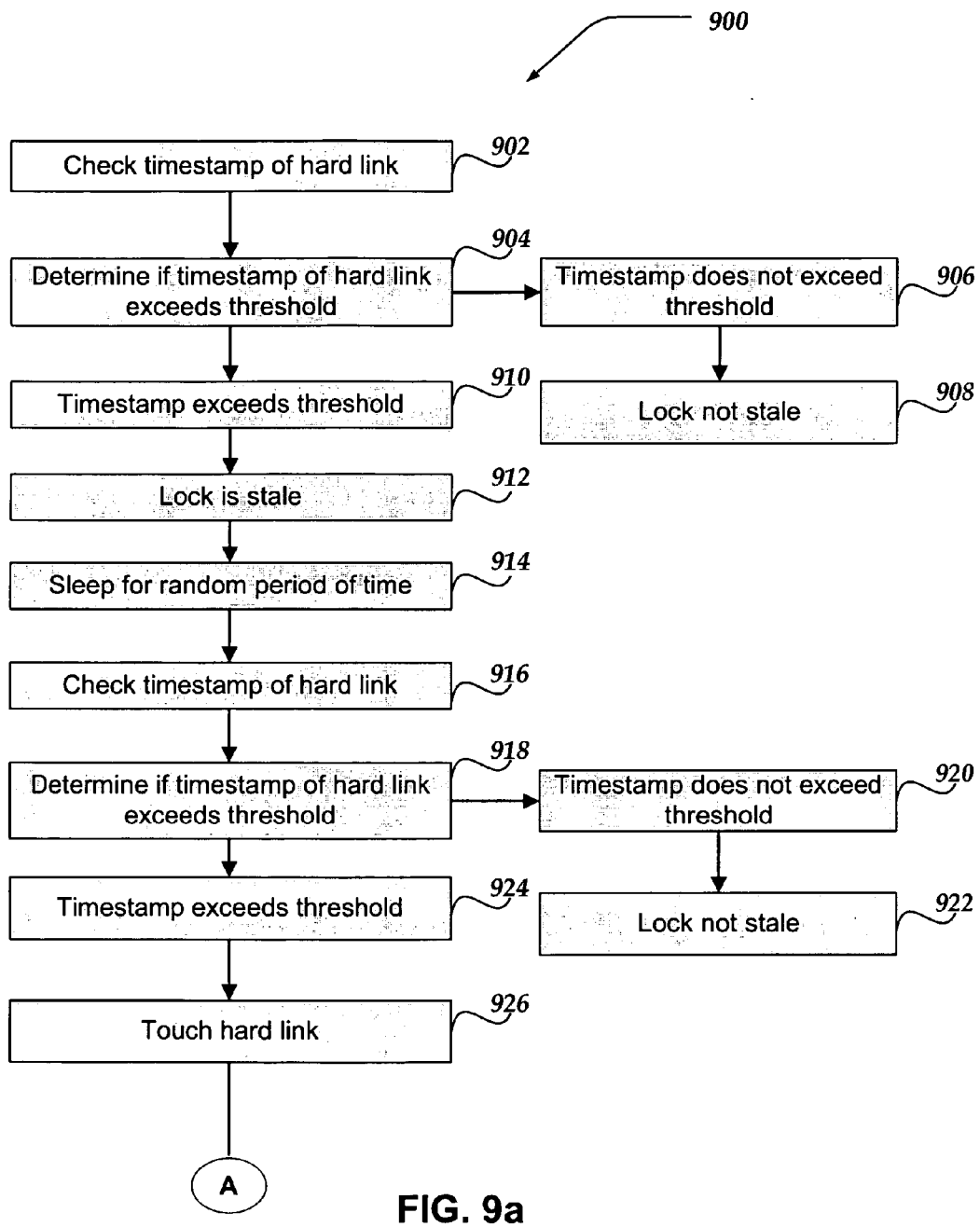
FIGS. 9a and 9b are a flowchart of one embodiment of a method for reclaiming a stale lock acquired according to the method of FIG. 7.
Figure 9B:
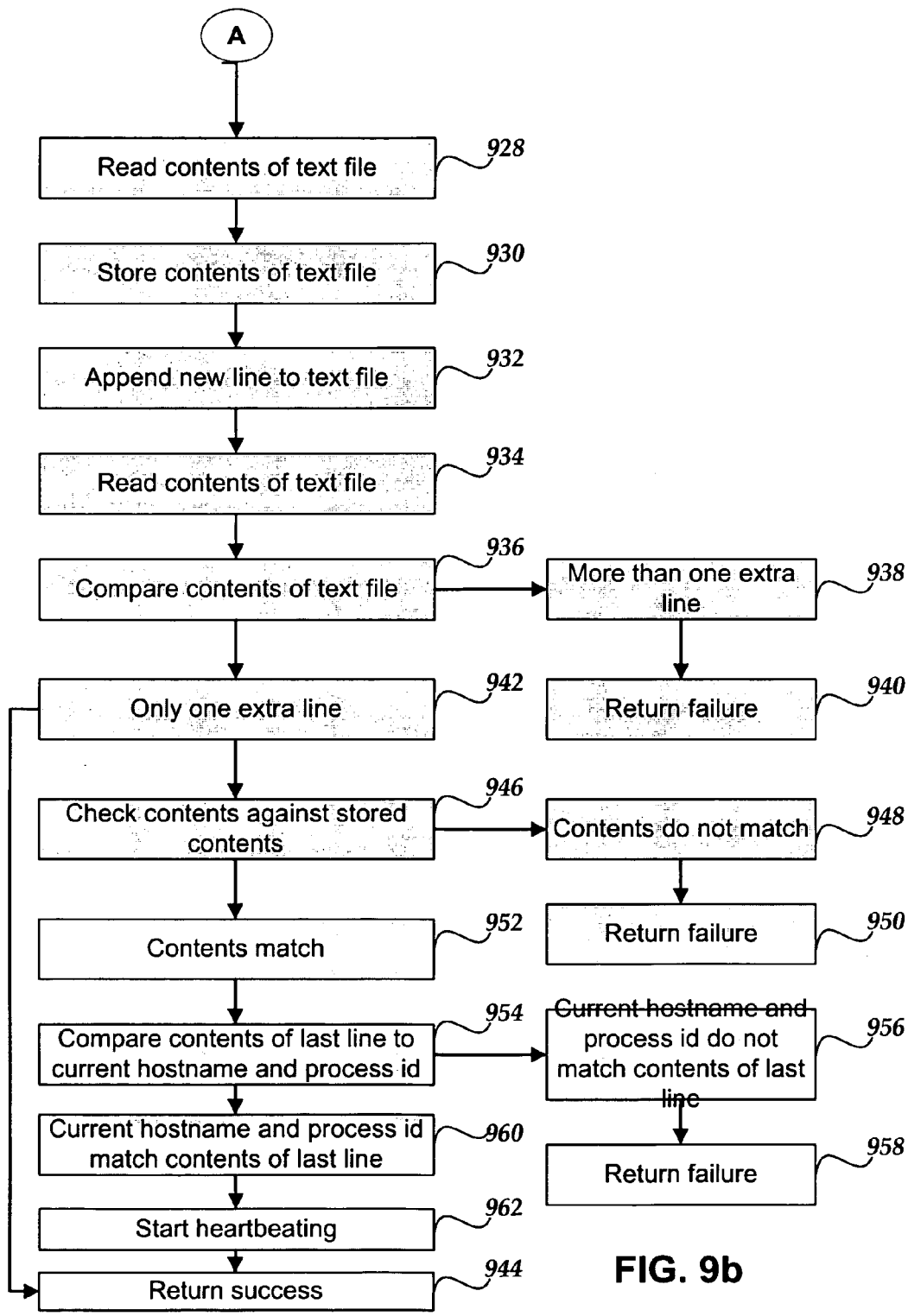

FIGS. 9a and 9b are a flow chart of one embodiment of a method for reclaiming a stale lock acquired according to the method of FIG. 7. A lock is determined to be stale if the lock has existed for more than a predetermined period of time. Generally, to reclaim a stale lock, a process attempting to reclaim the stale lock reads the hostname and process id stored in the text file created in the management library of the data structure when the lock was created and stores the contents of the text file. The process then appends it own hostname, process id, and a new timestamp to the contents of the text file and reads back the contents of the text file. The process compares the new contents of the text file to the original contents of the text file. If the process determines there is more than one extra line in the text file, then more than one process is attempting to reclaim the stale lock and a failure is returned. However, if the process determines there is only one extra line in the text file, then the process is the only process attempting to reclaim the stale lock and a signal is returned indicating the process has successfully reclaimed the stale lock.

The method 900 begins with a process attempting to reclaim a stale lock checking the timestamp of the hard link to the contents of the text file at block 902 and determining if the timestamp exceeds a predetermined period of time at block 904. If the timestamp does not exceed the predetermined period of time, block 906, the lock is not stale and a failure is returned at block 908. If the timestamp exceeds the predetermined period of time, block 910, the lock is stale, block 912.

After determining the lock is stale at block 912, the process attempting to reclaim the stale lock sleeps for a random period of time at block 914. Due to the fact multiple processes may be attempting to reclaim the stale lock at one time, sleeping for a random period of time filters many of the processes attempting to reclaim the stale lock.

After sleeping for a random period of time at block 914, the process again checks the timestamp of the hard link to the contents of the text file, block 916, and determines whether the timestamp exceeds the predetermined period at block 918. If the hard link is missing or the timestamp does not exceed the predetermined period of time, block 920, another process is attempting to reclaim the lock and a failure is returned at block 922. If the timestamp of the hard link to the contents of the text file exceeds the predetermined period of time, block 924, the process updates the timestamp of the hard link to ensure that other processes attempting to reclaim the lock return a failure, block 926.

The process proceeds to read the contents of the text file at block 928 and stores the contents of the text file at block 930. The process then appends a new line to the contents of the text file comprising the hostname for the machine on which the process attempting to reclaim the lock is running, a process id for the process attempting to reclaim the lock, and a new timestamp at block 932. The process again reads the contents of the text file at block 934 and compares the contents of the text file at block 936 to the contents of the text file saved at block 930.

If the process determines there is more than one extra line between the new contents of the text file and the original contents of the text file, block 938, the process determines that multiple processes are attempting to reclaim the lock due to multiple processes appending a new line comprising their hostname, process id, and timestamp to the contents of the text file. A failure is then returned indicating the lock was not successfully reclaimed at block 940. However, if the process determines that there is only one extra line between the new contents of the text file and the original contents of the text file, block 942, a success is returned indicating the lock was successfully reclaimed at block 944.

In one embodiment, after determining that there is only one extra line between the new contents of the text file and the original contents of the text file, block 942, the process may perform additional tests to ensure the lock has been successfully reclaimed. For example, the process may check the contents of all lines of the new text file, except the last line, against the contents of the original text file, block 946. If the contents of the new text file, except the last line, and the contents of the original text file do not match, block 948, a failure is returned indicating the lock was not successfully reclaimed at block 950.

If the contents of the new text file, except the last line, and the contents of the original text file do match, block 952, the hostname and process id stored in the last line of the text file are compared against the hostname and process id of the process attempting to reclaim the lock at block 954. If the hostname and process id do not match, block 956, a failure is returned indicating the lock was not successfully reclaim at block 958. However, if the hostname and process id do match, block 960, a heartbeat signal regarding the lock ceases at block 962 and a success is returned indicating the lock was successfully reclaimed at block 944.

One use of the lock acquisition, release, and reclamation methods described above with respect to FIGS. 7-9, is to ensure consistency throughout the batch processing system when pieces of data move between different data structures of the bath processing system. For example, it will be appreciated that as a task package moves between different queues of a pipeline stage such as when a worker finishes processing an input task package, the task package needs to be removed from the task queue and one or more output task packages need to be added to the replicator. Typically, the operations need to be done in an "all-or-none" manner so that inconsistencies do not occur throughout the pipeline stage. For example, if an all-or-none system were not implemented, if a task agent/worker pairing removes an input task package from the task queue and dies before adding the output task package to the replicator, the input task package would be lost. Alternatively, if a worker were to add an output test package to the replicator and then die before removing the input task package from the task queue, the input task package would be processed twice.

In order to implement all-or-none transactions between the queues in the pipeline stage, movement of units of work and task packages occur in two stages, a prepare phase and a commit phase. In the prepare phase, the units of work and task packages are prepared for a move, and in the commit phase, the units of work and task packages are committed to the move.

Generally, during the prepare phase, a coordinator such as a data structure initiating a transaction queries each queue involved in the transaction to determine whether the queue will be able to perform the operations necessary to perform the transaction. If the queue responds that it will be able to perform the operations necessary to perform the operations, the coordinator instructs the queue to begin preparing to perform the operations necessary to complete the transaction.

Once the coordinator has determined that each queue involved in the transaction will be able to perform the operations necessary to perform the transaction, the coordinator marks the transaction as committed and tells each queue involved in the transaction to perform the operations necessary to perform the operation. Each queue involved in the transaction then performs the operations necessary to perform the transaction and records a set of entries in a transaction log regarding which operations the queue performed in the transaction so that the operations may be rolled back if necessary.

At any time during the transaction, if an error occurs such as a coordinator failing to return to a queue in the transaction to instruct the queue to complete the transaction, the queue can determine whether to continue with the transaction. If the coordinator marked the transaction as committed, the queue determines to complete the operations necessary to perform the operation. However, if the coordinator has not marked the transaction as completed, the queue determines that it should not complete the operations necessary to complete the transaction and uses the set of entries in the transaction log relating to the transaction to roll back any operations the queue may have already completed.

Figure 10:
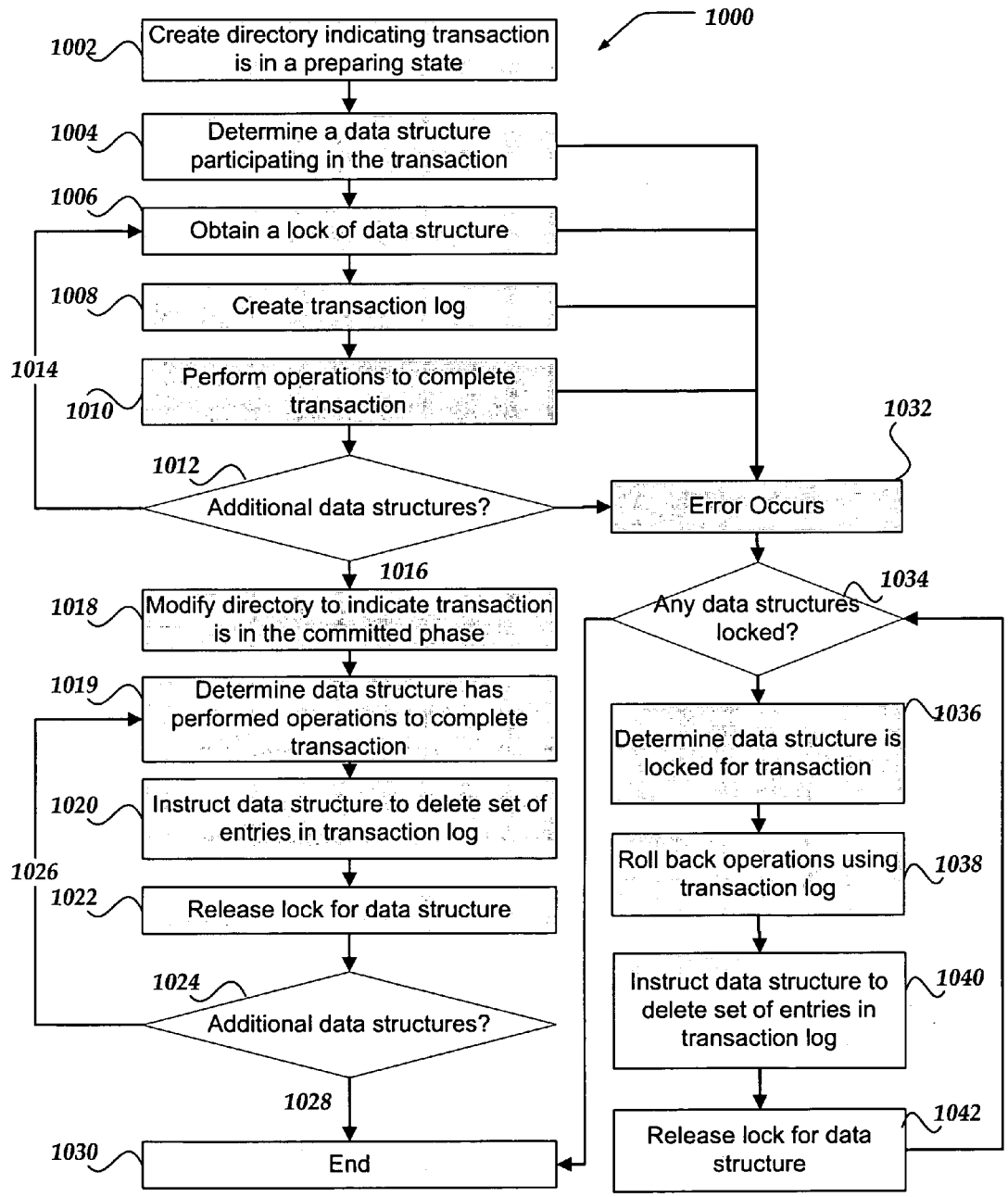
FIG. 10 is a flowchart of one method for performing an all-or-none transaction over a plurality of data structures.

FIG. 10 is a flow diagram of one embodiment of a method for performing an all-or-none transaction. The method 1000 begins with a coordinator creating a directory within a batch processing system comprising a transaction status locator ("TSL") that indicates the transaction is in a preparing state, block 1002. The TSL is a directory where a state of an active transaction is maintained. Typically, the batch processing system comprises a base location that is accessible directly, or indirectly, to all data structures where, for each active transaction, a sub directory is created comprising the TSL. The coordinator determines a queue that will need to perform operations in order to complete the transaction at block 1004 and obtains a lock for the queue at block 1006 in response to determining the queue will be able to perform a set of operations for completing the transaction. In one embodiment, the coordinator obtains a lock as described above with respect to FIG. 7. After obtaining the lock at block 1006, the queue creates a set of entries in a transaction log relating to the transaction at block 1008 to record any operations that are performed to complete the transaction and performs the actual operations necessary to complete the transaction at block 1010 in response to an instruction from the coordinator. The coordinator determines if there are any additional queues that will participate in the transaction at block 1012 and repeats steps 1004, 1006, 1008, and 1010 for each queue in the transaction 1014.

After the coordinator has obtained a lock of all the queues participating within the transaction and the queues have begun performing the operations to complete the transaction 1016, the coordinator marks the transaction as committed at block 1018. After marking the transaction as committed, the coordinator determines when a queue is finished performing the operations necessary to complete the transaction at block 1019 and instructs a queue in the transaction to delete the set of entries in the transaction log, block 1020, recording the operations that the queue performed to complete the transaction. Finally, the coordinator releases the lock for the queue at block 1022. The coordinator determines if there are any additional queues that participated in the transaction that need to be released at block 1024 and deletes the set of entries in the transaction log relating to the transaction at block 1020 and releases the lock at block 1022 for each queue in the transaction 1026 after determining the queue is finished performing the operations necessary to complete the transaction. Once the coordinator has instructed each queue in the transaction to delete the set of entries in the transaction log relating to the transaction and release the block 1028, the method ends at block 1030.

It will be appreciated that at any point in time during the prepare state, if the coordinator detects an error, block 1032, the coordinator determines if there are any queues that have been locked for the transaction. If there are no queues that have been locked for the transaction, the method ends 1030. However, if the coordinator determines a queue has been locked for the transaction, block 1036, the coordinator instructs the queue to roll back any operations the queue may have completed for the transaction using the set of entries in the transaction log, block 1038, and to delete the set of entries in the transaction log relating to the transaction, block 1040. Finally, the coordinator releases the lock for the queue at block 1042. The coordinator determines if there are any remaining queues that have been locked for the transaction, block 1034, and repeats the operations of blocks 1036, 1038, 1040, and 1042 until there are no remaining queues that are locked for the transaction. When there are no remaining queues that are lock for the transaction, the method ends at block 1030.

If an error occurs during the transaction such as a failure of the coordinator, a data structure such as a queue must determine whether to complete the transaction and delete the set of entries in the transaction log recording any operations performed by the queue to complete the transaction, or whether to use the set of entries in the transaction log to roll back any operations that were performed to complete the transaction. In one embodiment, if a coordinator does not return to a queue after a predetermined period of time, the queue will check the status of the transaction in the directory of the batch processing system. In another embodiment, the queue will check the status of the transaction in the directory of the batch processing when a process attempts to reclaim a lock on the queue. In both embodiments, if the transaction is marked as in the prepare phase, the queue uses the set of entries in the transaction log relating to the transaction to roll back any operations that have been performed by the queue to complete the transaction and deletes the set of entries in the transaction log relating to the transaction. If the transaction is marked as in the commit phase, the queue deletes the set of entries in the transaction log relating to the transaction to complete the transaction.

Figure 11:
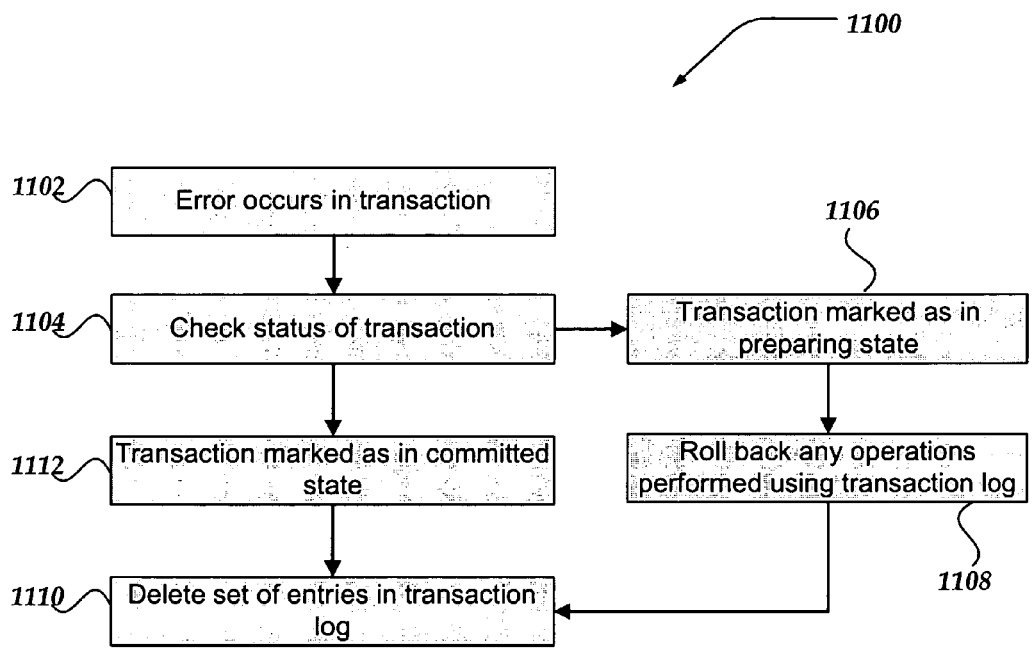
FIG. 11 is a flowchart of one embodiment of a method for a queue to recover after an error during an all-or-none transaction over a plurality of data structures.

FIG. 11 is a flow diagram of one embodiment of a method for a queue to recover during an all-or-none transaction. The method 1100 begins with an error occurring in the batch processing system during the transaction at block 1102. Examples of errors that could occur during the transaction include a coordinator being unable to obtain a lock for a queue that is participating in the transaction; invalid data in a task package involved in the transaction; a coordinator being unable to access a queue that is participating in the transaction; a coordinator failing during the transaction; or a data structure performing an invalid operation on a queue.

After a predetermined period of time, each queue checks the status of the transaction in the directory of the batch processing system comprising the TSL at block 1104. If the transaction is marked as being prepared, block 1106, the queue uses the set of entries in the transaction log relating to the transaction to roll back any operations the queue has performed to complete the transaction at block 1108 and deletes the set of entries in the transaction log relating to the transaction at block. If the transaction is marked as committed, block 1112, the queue deletes the set of entries in the transaction log relating to the transaction at block 1110.

It will be appreciated that the disclosed pipeline architecture, transactional support methods, and fail-safe/self-recover methods provide for a batch processing system operative to distribute processing over a plurality of data structures for parallel processing, and able to quickly and efficiently recover from errors so that no single point of failure within the batch processing system may prevent the processing of large volumes of data. In the context of online advertisement service providers such as Yahoo! Search Marking, this efficient batch processing system provides an advertisement service provider the ability to quickly provide information regarding a served advertisement a short time after the advertisement service provider serves the advertisement.

It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method for acquiring a lock of a data structure in a network file system ("NFS") environment with a processor, the method comprising:
    creating a text file in a management library of the data structure, wherein a name of the text file comprises an identifier of the lock, an identifier of a process attempting to acquire the lock, and an identifier of a machine on which the process attempting to acquire the lock is running;
    storing the identifier of the process attempting to acquire the lock in the contents of the text file;
    storing the identifier of the machine on which the process attempting to acquire the lock is running in the contents of the text file;
    creating a hard link that points to the text file;
    determining a number of links pointing to the text file;
    locking the data structure based on the number of links pointing to the text file;
    reading the contents of the text file;
    determining whether the contents of the text file comprise the identifier of the process that acquired the lock;
    determining whether the contents of the text file comprise the identifier of the machine on which the process that acquired the lock is running; and
    determining whether to release the lock of the data structure based on whether the contents of the text file comprise the identifier of the process that acquired the lock and the identifier of the machine on which the process that acquired the lock is running,
    wherein determining whether to release the lock of the data structure based on whether the contents of the text file comprise the identifier of the process that acquired the lock and the identifier of the machine on which the process that acquired the lock is running comprises:
        releasing the lock of the data structure in response to determining the contents of the text file comprises both the identifier of the process that acquired the lock and the identifier of the machine on which the process that acquired the lock is running, and
        maintaining the lock of the data structure in response to determining the contents of the text file does not comprise at least one of the identifier of the process that acquired the lock or the identifier of the machine on which the process that acquired the lock is running.

2. The method of claim 1, wherein determining the number of links pointing to the text file comprises:
    determining whether two links are pointing to the text file.

3. The method of claim 2, wherein locking the data structure based on the number of links pointing to the text file comprises:
    locking the data structure in response to determining the number of links pointing to the text file is two.

4. The method of claim 2, wherein locking the data structure based on the number of links pointing to the text file comprises:
    failing to lock the data structure in response to determining the number of links pointing to the text file is other than two.

5. The method of claim 1, further comprising:
    restricting access to the data structure in response to locking the data structure.

6. The method of claim 5, wherein restricting access to the data structure comprises:
    only permitting the process acquiring the lock to access the data structure.

7. The method of claim 1, wherein releasing the lock comprises:
    removing the text file and the hard link from the management library of the data structure.

8. The method of claim 1, further comprising:
    after a predetermined period of time, determining for a second time whether the contents of the text file comprise the identifier of the process that acquired the lock;
    after the predetermined period of time, determining for a second time whether the contents of the text file comprise the identifier of the machine on which the process that acquired the lock is running; and
    after the predetermined period of time, determining whether to release the lock of the data structure based on whether the contents of the text file comprise the identifier of the process that acquired the lock and the identifier of the machine on which the process that acquired the lock is running.

9. The method of claim 1, further comprising:
    initiating a heartbeat signal in response to locking the data structure.

10. A computer-readable storage medium comprising a set of instructions for acquiring a lock of a data structure in a network file system ("NFS") environment, the set of instructions to direct a processor to perform acts of:
    creating a text file in a management library of a data structure, wherein a name of the text file comprises an identifier of the lock, an identifier of a process attempting to acquire the lock, and an identifier of a machine on which the process attempting to acquire the lock is running;
    storing the identifier of the process attempting to acquire the lock in the contents of the text file;

storing the identifier of the machine on which the process attempting to acquire the lock is running in the contents of the text file;

creating a hard link that points to the text file;

determining a number of links pointing to the text file;

locking the data structure based on the number of links pointing to the text file;

reading the contents of the text file;

determining whether the contents of the text file comprise the identifier of the process that acquired the lock;

determining whether the contents of the text file comprise the identifier of the machine on which the process that acquired the lock is running; and determining whether to release the lock of the data structure based on whether the contents of the text file comprise the identifier of the process that acquired the lock and the identifier of the machine on which the process that acquired the lock is running, wherein determining whether to release the lock of the data structure based on whether the contents of the text file comprise the identifier of the process that acquired the lock and the identifier of the machine on which the process that acquired the lock is running comprises:

releasing the lock of the data structure in response to determining the contents of the text file comprises both the identifier of the process that acquired the lock and the identifier of the machine on which the process that acquired the lock is running, and maintaining the lock of the data structure in response to determining the contents of the text file does not comprise at least one of the identifier of the process that acquired the lock or the identifier of the machine on which the process that acquired the lock is running.

11. The computer-readable storage medium of claim 10, wherein determining the number of links points to the text file comprises:

determining whether two links are pointing to the text file.

12. The computer-readable storage medium of claim 11, wherein locking the data structure based on the number of links pointing to the text file comprises:

locking the data structure in response to determining the number of links pointing to the text file is two.

13. The computer-readable storage medium of claim 11, wherein locking the data structure based on the number of links pointing to the text file comprises:

failing to lock the data structure in response to determining the number of links pointing to the text file is other than two.

14. The computer-readable storage medium of claim 10, further comprising a set of instructions to direct the processor to perform acts of:

restricting access to the data structure in response to locking the data structure.

15. The computer-readable storage medium of claim 14, wherein restricting access to the data structure comprises:

only permitting the process acquiring the lock to access the data structure.

16. The computer-readable storage medium of claim 10, wherein releasing the lock comprises:

removing the text file and the hard link from the management library of the data structure.

17. The computer-readable storage medium of claim 10, further comprising a set of instructions to direct the computer system to perform acts of:

after a predetermined period of time, determining for a second time whether the contents of the text file comprise the identifier of the process that acquired the lock;

after the predetermined period of time, determining for a second time whether the contents of the text file comprise the identifier of the machine on which the process that acquired the lock is running; and after the predetermined period of time, determining whether to release the lock of the data structure based on whether the contents of the text file comprise the identifier of the process that acquired the lock and the identifier of the machine on which the process that acquired the lock is running.

18. The computer-readable storage medium of claim 10, wherein the set of instructions further direct the processor to perform acts of:

initiating a heartbeat signal in response to locking the data structure.

19. A computer-implemented method for acquiring a lock of a data structure in a network file system ("NFS") environment, the method comprising:

creating, with a processor, a text file in a management library of the data structure, wherein a name of the text file comprises an identifier of the lock, an identifier of a process attempting to acquire the lock, and an identifier of a machine on which the process attempting to acquire the lock is running;

storing, with a processor, the identifier of the process attempting to acquire the lock in the contents of the text file;

storing, with a processor, the identifier of the machine on which the process attempting to acquire the lock is running in the contents of the text file;

creating, with a processor, a hard link that points to the text file;

determining, with a processor, a number of links pointing to the text file;

locking, with a processor, the data structure based on the number of links pointing to the text file;

determining, with a processor, whether a timestamp of the hard link is greater than a predetermined period of time;

updating, with a processor, the time stamp of the hard link;

reading and storing, with a processor, the contents of the text file;

appending, with a processor, a new line to the contents of the text file, the new line comprising an identifier of a second process attempting to reclaim a lock, an identifier of a machine on which the second process is running, and a second timestamp;

reading, with a processor, the new contents of the text file;

comparing, with a processor, the contents of the text file before the second process appended the new line to the contents of the text file to the contents of the text file after the second process appended the new line to the contents of the text file; and determining, with a processor, whether to release the lock of the data structure to the second process based on the comparison of the contents of the text file before the second process appended the new line and the contents of the text file after the second process appended the new line to the contents of the text file.

20. The method of claim 19, wherein determining, with a processor, whether to release the lock of the data structure to the second process based on the comparison of the contents of the text file before the second process appended the new line and the contents of the text file after the second process appended the new line to the contents of the text file comprises:

releasing, with a processor, the lock of the data structure to the second process in response to determining, with a processor, the contents of the text file after the second process appended the new line to the contents of the text file comprises one more line than the contents of the text file before the second process appended the new line to the contents of the text file.

21. The method of claim 19, wherein determining, with a processor, whether to release the lock of the data structure to the second process based on the comparison of the contents of the text file before the second process appended the new line and the contents of the text file after the second process appended the new line to the contents of the text file comprises:

maintaining, with a processor, the lock of the data structure in response to determining the contents of the text file after the second process appended the new line to the contents of the text file comprises more than one line than the contents of the text file before the second process appended the new line to the contents of the text file.

22. A computer-readable storage medium comprising a set of instructions for acquiring a lock of a data structure in a network file system ("NFS") environment, the set of instructions to direct a processor to perform acts of:

creating a text file in a management library of a data structure, wherein a name of the text file comprises an identifier of the lock, an identifier of a process attempting to acquire the lock, and an identifier of a machine on which the process attempting to acquire the lock is running;

storing the identifier of the process attempting to acquire the lock in the contents of the text file;

storing the identifier of the machine on which the process attempting to acquire the lock is running in the contents of the text file;

creating a hard link that points to the text file;

determining a number of links pointing to the text file;

locking the data structure based on the number of links pointing to the text file;

determining whether a timestamp of the hard link is greater than a predetermined period of time;

updating the time-stamp of the hard link;

reading and storing the contents of the text file;

appending a new line to the contents of the text file, the new line comprising an identifier of a second process attempting to reclaim a lock, an identifier of a machine on which the second process is running, and a second timestamp;

reading the new contents of the text file;

comparing the contents of the text file before the second process appended the new line to the contents of the text file to the contents of the text file after the second process appended the new line to the contents of the text file; and determining whether to release the lock of the data structure to the second process based on the comparison of the contents of the text file before the second process appended the new line and the contents of the text file after the second process appended the new line to the contents of the text file.

23. The computer-readable storage medium of claim 22, wherein determining whether to release the lock of the data structure to the second process based on the comparison of the contents of the text file before the second process appended the new line and the contents of the text file after the second process appended the new line to the contents of the text file comprises:

releasing the lock of the data structure to the second process in response to determining the contents of the text file after the second process appended the new line to the contents of the text file comprises one more line than the contents of the text file before the second process appended the new line to the contents of the text file.

24. The computer-readable storage medium of claim 22, wherein determining whether to release the lock of the data structure to the second process based on the comparison of the contents of the text file before the second process appended the new line and the contents of the text file after the second process appended the new line to the contents of the text file comprises:

maintaining the lock of the data structure in response to determining the contents of the text file after the second process appended the new line to the contents of the text file comprises more than one line than the contents of the text file before the second process appended the new line to the contents of the text file.

* * * * *